United States Patent Office 3,560,472
Patented Feb. 2, 1971

3,560,472
METHOD OF TREATING MOLECULAR SIEVES
Arnaud M. J. de Gramont, Saint-Adresse, Seine-Maritime, and Lucien G. Choquet, Le Havre, Seine-Maritime, France, assignors to Compagnie Francaise de Raffinage, Paris, France
No Drawing. Filed Jan. 30, 1969, Ser. No. 795,363
Claims priority, application France, Jan. 31, 1968, 138,104
Int. Cl. C07c *11/08;* C08d *3/06, 3/10*
U.S. Cl. 260—94.2         6 Claims

ABSTRACT OF THE DISCLOSURE

A method of treating molecular sieves has been provided whereby the polymerizing and isomerizing properties of the sieves are substantially reduced. According to this method, the sieves are first contacted with a mixture containing at least one diolefin with conjugated double bonds under conditions in which a part of the diolefin is polymerized onto the surfaces of the molecular sieves and then the thus treated sieves are contacted with an olefin which is sought to be purified.

---

This invention relates to a method of treating molecular sieves which is intended to inhibit their polymerizing and isomerizing properties; more particularly the invention relates to a pretreatment of molecular sieves for their use for separating mixtures which contain olefins.

It is well known to separate straight-chain hydrocarbons from branched-chain hydrocarbons by means of molecular sieves; it is known that certain silico-aluminates have a regular porous structure such that the diameter of the pores is constant. If a silico-aluminate were selected whose pore diameter is intermediate between the sizes of the different molecules present, then it will act with respect to said molecules as a true sieve; and the molecules which are of a smaller size than the diameter of the pores will penetrate into the sieve, while the other molecules remain on its outside; as these sieves have the property of adsorbing certain hydrocarbons on their surface, only those molecules which have penetrated into the sieve will be retained in the pores. Therefore, the sieves retain hydrocarbons of smaller size so that the mixture which emerges from the sieve bed is enriched with hydrocarbons of large size. These properties have already been used to separate hydrocarbons with branched chains, and which therefore are very large, from straight-chain hydrocarbons which are of small size.

Nevertheless, the commercial molecular sieves have a certain surface acidity which results in characteristic reactions which are catalyzed by acids, such as, for instance, isomerization and polymerization; these reactions which do not occur when saturated hydrocarbons are treated do occur when it is desired to use molecular sieves to fractionate mixtures which contain olefins.

Thus, when it is desired to separate olefins and isoolefins on a commercial molecular sieve, a substantial polymerization of the isoolefin is noted on the outer surface of the sieve, and the polymer formed clogs the pores and makes the sieve inoperative. In order to avoid this polymerization, it has already been recommended to neutralize the surface acidity of the sieve with various bases, for instance with nitrogen bases, such as ammonia, quinoline, etc., or by strong bases, such as sodium or potassium in aqueous or alcoholic solutions.

The drawback of this manner of neutralization is that the capacity of the sieve is decreased due to the presence of the neutralizing base molecules.

The applicants have now very surprisingly discovered that it is possible to avoid the polymerization and isomerization reactions on the surface of molecular sieves when polymers of diolefins having conjugated double bonds are retained on the surface of said sieves.

The object of the invention is therefore a method of treating molecular sieves which is intended to neutralize their polymerizing and isomerizing properties, in which the sieves are first contacted with a mixture containing at least one diolefin with conjugated double bonds, under conditions in which a part of the said diolefin polymerizes on the surface of the said molecular sieves.

The invention can be used in particular for the fractionating of mixtures containing unsaturated hydrocarbons, including mixtures containing the same diolefin as that which served for the preliminary treatment of the molecular sieve. Thus the invention can be used for the fractionating of olefins and isoolefins or for the purifying of isoolefins; in the latter case, for example, butadiene contained as impurity in isobutylene can be eliminated on a sieve which has been pretreated by butadiene itself.

All the known molecular sieves can be treated in accordance with the invention. For example, the molecular sieves of A type sold by Linde Company, Division of Union Carbide Corporation, can be treated.

In the case of the purification of isoolefins, molecular sieves are employed the pore diameter of which is intermediate between the size of the said olefin and that of the impurities to be removed. In the case of the purification of isobutylene, a sieve of type 5A is used, that is to say, a sieve whose pore diameter is 5A.

The diolefin which is polymerized on a molecular sieve may be any diolefin which has between 4 and 7 carbon atoms per molecule. Butadiene or isoprene is preferred, these being the best known and more easily polymerizing species. Whatever the diolefin used, the treated sieve can be used for any type of fractionation or purification.

In order to treat the molecular sieve with a diolefin, first of all the diolefin is adsorbed under customary conditions, whereupon the sieve which has adsorbed the said diolefin is treated under conditions in which a part of the diolefin is polymerized on the surface of the sieve. The polymerization of the diolefin on the surface of the sieve depends primarily on the temperature. A temperature of between 80–120° C. is generally employed, the diolefin being in gaseous phase and under atmospheric pressure.

The length of time during which the sieve is maintained at the polymerization temperature of the diolefin varies as a function of the quantity of diolefin which it is desired to polymerize. It is generally between one-quarter hour and two hours.

The quantity which is polymerized on the surface of the sieve depends on the nature of the diolefin itself. It is generally between 0.5% and 10%. In the case of butadiene, between 0.5% and 4% thereof is polymerized; in the case of isoprene, the quantities which give the best result are between 1% and 6%, referred to the weight of the treated molecular sieve.

Fractionations and purifications of unsaturated hydrocarbons on molecular sieves treated in accordance with the invention are carried out under the general conditions which are well known for the treatment of hydrocarbons by molecular sieves. One can operate, for instance, in liquid phase or in gaseous phase. For example, isobutylene can be purified in liquid phase at room temperature under a pressure of 5 bars (1 bar=0.987 atmosphere) so as to maintain the charge in liquid phase; one can also operate in gaseous phase at room temperature and atmospheric pressure. The temperature and pressure conditions may vary to a wide extent, but for practical reasons one will always try to come as close as possible to standard conditions.

The present invention is further illustrated by the following examples which are not limitative.

EXAMPLE 1

This example is given by way of comparison so as to show that an untreated sieve causes the polymerization of the isobutylene.

Employing 200 g. of a 5A molecular sieve supplied by the Linde Company, 1120 g. of liquid isobutylene are passed over this sieve at a rate of 0.9 v./v./hr. (volume of liquid isobutylene per volume of sieve per hour), the temperature being room temperature and the pressure being maintained at 5 bars. After the treatment of this charge, the pressure is reduced to atmospheric pressure and the compounds which have been adsorbed are eliminated by increasing the temperature. Among these compounds there are obtained 60.5 g. of polymeric isobutylene, which represent 5.4% of the weight of the charge.

EXAMPLE 2

This example illustrates the invention and shows that a sieve treated with butadiene avoids the subsequent polymerization of isobutylene.

204.6 g. of molecular sieve of type 5A are used for this purpose. A charge of pure butadiene is passed over this sieve at room temperature at a rate of 30 volumes of gaseous butadiene per volume of sieve per hour. Due to the adsorption of butadiene on the sieve, the temperature of the sieve rises to about 80° C., and thereupon, when no further adsorption takes place, the passage of the butadiene is stopped and the sieve is brought for 1 hour to 100° C. Thereupon it is cooled to 25° C. and it is noted that its weight has increased to 227.85 g. 1161 g. of liquid isobutylene are then passed over the sieve which has been treated in this fashion at a rate of 0.9 v./v./hr. under pressure of 5 bars (gauge).

After reduction of the pressure and elimination of the isobutylene, 0.8 g. of isobutylene polymer are collected, namely 0.069% of the charge treated. It is thus seen, as compared with Example 1, that the prior treatment of the molecular sieve by the butadiene practically avoids any subsequent polymerization of the isobutylene.

EXAMPLE 3

197.2 g. of molecular sieve 5A are used and a charge of isoprene is passed over it for 1 hour while maintaining the temperature at 100° C. The sieve which has thus been treated is then purged with nitrogen, and it is found that the weight of the sieve is then 199.3 g.; thereafter it is cooled to 25° C. In order to verify that the sieve has no further polymerizing activity with respect to isoolefins, 1123.5 g. of pure liquid isobutylene are passed over said sieve at a rate of 0.9 v./v./hr. under a pressure of 5 bars (gauge).

After reduction of the pressure and elimination of the isobutylene from the product collected, there remain 1.3 g. of polyisobutylene, namely 0.12% by weight of the charge.

After elimination of isobutylene, pure butadiene is adsorbed on this same sieve at room temperature, but the temperature is not increased to polymerize said butadiene.

The weight of the sieve is then 21.15 g., which represents a butadiene capacity of 10.72%, referred to the sieve, before any operation. Of course, under these conditions, the butadiene is adsorbed but it is not polymerized; it is then recovered upon desorption.

This example shows, as compared with Example 1, that the treatment of the sieve with isoprene has considerably decreased the quantity of isobutene polymer which forms on the surface. It furthermore shows that this treatment does not affect the capacity of the sieve with respect to adsorbable hydrocarbons, such as butadiene.

EXAMPLE 4

Isoprene is passed for 1 hour over 141.5 g. of 5A molecular sieve maintained at 100° C. The sieve is then cooled to 25° C. and purged with nitrogen. The weight of the sieve after this operation is 147.2 g., that is to say, 4.02% isoprene polymers have attached to the sieve. When gaseous isobutylene is then passed over said sieve at 100° C. at atmospheric pressure at a rate of 240 v./v./hr. and the isobutylene emerging from the sieve is analyzed, is found that no polymer is collected and that the increase in weight of the sieve is zero.

This example clearly shows that the treatment with isoprene has avoided any polymerization of the isobutylene on the surface of the sieve.

What is claimed is:

1. A method for substantially reducing the polymerizing and isomerizing properties of molecular sieves used in purification of hydrocarbon stream containing isobutylene which consists essentially of contacting a molecular sieve of about 5A with a hydrocarbon mixture containing a conjugated diolefin of 4 to 7 carbon atoms under polymerization conditions, wherein the conjugated diolefin is polymerized on the surface of the molecular sieve and the amount of said diolefin polymerized on the molecular sieve being between about 0.5 and 10% by weight of said sieve and contacting the hydrocarbon stream sought to be purified with the thus treated molecular sieve to recover the purified olefin.

2. The method according to claim 1 wherein the temperature at which the diolefin is polymerized on the molecular sieve is between 80° and 120° C.

3. The method according to claim 1 wherein the diolefin is isoprene.

4. The method according to claim 1 wherein the diolefin is butadiene.

5. The method according to claim 1 and wherein the diolefin is isoprene, and it is polymerized on the surface of said sieve in an amount between 1% and 6% by weight of said sieve.

6. The method according to claim 1 and wherein the diolefin is butadiene and it is polymerized on the surface of said sieve in an amount between 0.5% and 4%.

References Cited

UNITED STATES PATENTS 2,900,430   8/1959   Henke et al. _____ 260—94.2X
3,209,050   9/1965   Hanson _____ 260—94.2X JOSEPH L. SCHOFER, Primary Examiner W. F. HAMROCK, Assistant Examiner U.S. Cl. X.R.

260—2, 677